May 15, 1962   H. W. ASCHINGER   3,034,471
METHOD OF NESTING AN UNDERWATER TOWED VEHICLE
Filed Aug. 25, 1959
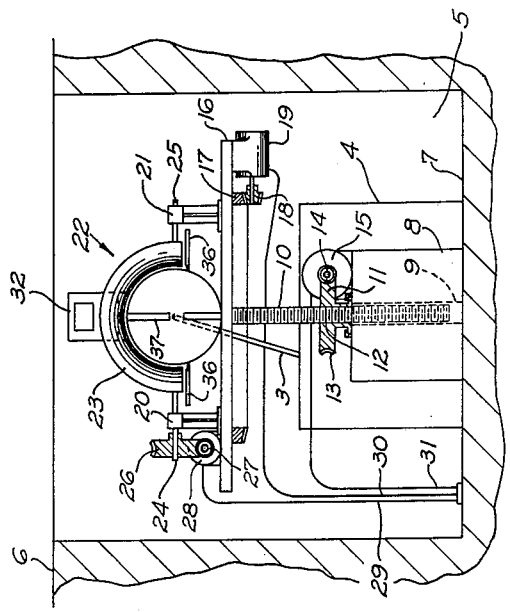
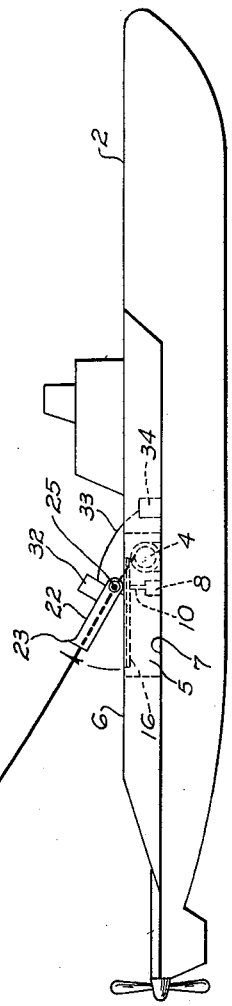
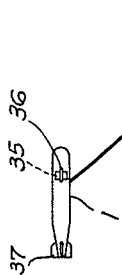
INVENTOR.
Harold W. Aschinger
BY Karl Kuhn Attorney
John S. Kovaleu Agent

United States Patent Office 3,034,471
Patented May 15, 1962

3,034,471
METHOD OF NESTING AN UNDERWATER TOWED VEHICLE
Harold W. Aschinger, Ridgefield, N.J., assignor, by mesne assignments, to Vare Industries, Roselle, N.J., a corporation of New Jersey
Filed Aug. 25, 1959, Ser. No. 835,870
2 Claims. (Cl. 114—235)

The present invention deals with a method of nesting an underwater towed vehicle and more particularly with a method of underwater homing and nesting an underwater towed vehicle.

It is an object of the present invention to provide a method whereby an underwater towed vehicle is operated, homed and nested from an underwater vessel.

It is another object of the invention to provide a method for guiding a towed underwater vehicle to a nest on an underwater vehicle and securing the nested vehicle.

Other objects and advantages of the invention will become apparent from the description hereinafter following and the drawings forming a part hereof, in which:

FIGURE 1 illustrated a partly diagrammatic and partly elevational view of a system for nesting an underwater vehicle, and FIGURE 2 illustrates a partly elevational and partly cross-sectional view of a nested vehicle.

The invention deals with a method for nesting, homing and securing an underwater vehicle to an underwater vessel while both are in motion and whereby fouling and damage to either or both are precluded by visually guiding the towed vehicle to a nest during its homing travel.

Regarding the illustrations, an underwater towed vehicle 1 is towed by a submerged towing vessel or submarine 2 by means of a cable 3 operated by a drum 4 mounted on the vessel 2.

The towed vehicle 1 is more particularly described in copending application Serial No. 835,529, filed August 24, 1959, and the drum 4 including cable 3 is more particularly described in copending application Serial No. 833,877, filed August 14, 1959.

The towing vessel 2 is provided with a nest 5 recessed in the deck 6 of the towing vessel and the recess 5 comprises a floor 7 on which is mounted a base 8 having a bore 9 therein. A screw 10 is vertically mounted on the base and is vertically movable in the bore 9. A worm wheel 11 is rotatably mounted on the base above the bore 9 and comprises inner threads 12 engaging the screw 10 and outer gear teeth 13 engaged with a worm drive 14 connected to motor 15. The top of the screw 10 is provided with a rotatable platform 16 having a gear ring 17 on its undersurface engaged with a bevel gear 18 connected to motor 19, the motor being mounted on the platform. A pair of laterally spaced uprights 20 and 21 extend vertically from platform 16. A semi-cylindral concave hood 22 having a flared end 23 is mounted between the uprights 20 and 21 by means of shafts 24 and 25 journalled in the upper ends of the uprights. A gear 26 is mounted on one of the shafts and is engaged with a worm 27 connected to a motor 28 mounted on the platform. Electrical leads 29, 30 and 31 lead from inside the vessel 2 to motors 28, 19 and 15, respectively. A television camera 32 is mounted on the hood 22 and energized by means of cable 33 connected to a source of electrical energy 34 inside the vessel.

In operation, motor 15 is activated whereby the worm wheel 11 operates the screw 10 to elevate the platform to the level of deck 6. Motor 28 is activated to elevate the hood 22 on shafts 20 and 21 and winch 4 releases cable whereby the vehicle connected to the cable is caused to disengage from between the platform 16 and hood 23 and leave the deck of the vessel 2. When the cable is released a predetermined length, electrical signals are transmitted and received from the vessel 2 to the vehicle 1 by means of cable 3. The cable 3 also transmits electrical energy to motor means 35 connected to hydrofoils 36 and rudders 37 to steer the vehicle.

After serving its mission, the vehicle 1 is caused to return to the vessel 2 by operating winch 4 and piloting by means of signals transmitted to vehicle operating motor 35. As the vehicle approaches the nest 5, the television camera 32 is operated, and the vehicle enters the line of sight of the camera by operating motors 28 and 19 to direct the camera in line of sight with the approaching vehicle. At this point the vehicle is in camera sight and the motors 28 and 19 are further operated to direct the vehicle into the hood 22. When seated in hood 22, the winch 4 is stopped and motor 28 is continued to operate until the vehicle rests snugly between platform 16 and hood 22. Motor 15 is then operated to lower the platform 16 into the vehicle nest 5.

Various modifications of the invention are contemplated within the scope of the appended claims.

What is claimed is:

1. The method of nesting an underwater towed vehicle comprising steering and simultaneously drawing the towed vehicle toward a submerged nest by cable means, televising the approaching vehicle, visually directing the vehicle into engagement with a hood mounted on a base in the submerged nest, and lowering the hood and vehicle into the nest.

2. The method according to claim 1, comprising drawing the towed vehicle toward a submerged nest on a moving underwater vehicle.

References Cited in the file of this patent
UNITED STATES PATENTS

| | | |
|---|---|---|
| 2,027,527 | Hammond | Jan. 14, 1936 |
| 2,215,365 | Vestergren | Sept. 17, 1940 |
| 2,314,698 | Gray | Mar. 23, 1943 |
| 2,355,086 | Lang | Aug. 8, 1944 |
| 2,433,971 | Adams | Jan. 6, 1948 |
| 2,616,031 | Nosker | Oct. 28, 1952 |
| 2,792,190 | Seibold | May 14, 1957 |
| 2,963,543 | Link et al. | Dec. 6, 1960 |